United States Patent [19]

Joh et al.

[11] Patent Number: 5,452,169
[45] Date of Patent: Sep. 19, 1995

[54] VARIABLE BULGE DEVICE FOR ROTATABLE HEAD DRUM

[75] Inventors: Joong K. Joh; Soo K. Kim; Mun C. Joung, all of Seoul; Ho W. Lee, Kyungki-Do; Yoon S. Seoh; Seung I. Kim, both of Seoul; Hyun K. Park, Kyungki-Do; Kwan B. Sim; Weon K. Lee, both of Seoul, all of Rep. of Korea

[73] Assignee: Goldstar Co., Ltd., Seoul, Rep. of Korea

[21] Appl. No.: 213,842

[22] Filed: Mar. 14, 1994

[30] Foreign Application Priority Data

Mar. 19, 1993 [KR] Rep. of Korea .................. 4085/1993
Mar. 19, 1993 [KR] Rep. of Korea .................. 4227/1993

[51] Int. Cl.$^6$ ............................................. G11B 15/60
[52] U.S. Cl. ................................................. 360/30.24
[58] Field of Search ............................ 360/130.24, 69

[56] References Cited

FOREIGN PATENT DOCUMENTS

| 4-1967 | 4/1992 | Japan | G11B 15/61 |
| 4252454 | 9/1992 | Japan | 360/130.24 |

Primary Examiner—A. J. Heinz
Attorney, Agent, or Firm—Fliesler, Dubb, Meyer & Lovejoy

[57] ABSTRACT

A variable bulge device for displacing bulges of a rotation head drum, capable of adjusting a protruded amount of a bulge used, depending on a rotation speed of the rotating head drum and the kind of a tape used. The device includes an operating member partially protruded at one end thereof through a bulge hole formed at a lower drum of the rotation head drum, the operating member having a variable bulge provided by the protruded end, and a drive unit for driving the operating member and thereby adjusting the protruded amount and position of the variable bulge. For adjusting a protruded amount of a bulge used, depending on a rotation speed of the rotating head drum and the kind of a tape used, the device includes a hollow elastic rubber film partially protruded at an upper end thereof through a bulge hole formed at a lower drum of the rotation head drum, the elastic rubber film having a variable bulge provided by the protruded end, an operating fluid contained in the elastic rubber film, an operating fluid expanding unit adapted to expand the operating fluid and thereby adjust the protruded amount of the variable bulge.

13 Claims, 12 Drawing Sheets

VARIABLE BULGE DEVICE FOR ROTATABLE HEAD DRUM

BACKGROUND OF THE INVENTION

1. Field of the Invention

The present invention relates to a variable bulge device for a rotation head drum, capable of being used in video cassette recorders, digital audio tape recorders and camcorders, and more particularly to such a device capable of adjusting a protruded amount of a bulge, depending on a rotation speed of the rotating head drum and the kind of a tape used.

2. Description of the Prior Art

In a magnetic recording and reproducing apparatus including a rotation head device, a tape T is partially wound around upper and lower drums 1a and 1b of the rotation head device. During travel of the tape T, a rotation head 3 of the rotation head device performs a recording operation and a reproducing operation. When the rotation head 3 comes into contact with the tape T or moves away from the tape T, a slight vibration is generated from the tape T. This vibration results in error generated by lapse of time and so called impact error. By such an impact error, a picture distortion of reproduced image may be generated which results in a degradation in picture quality. The impact error is more severely generated when the rotation head 3 moves away from the tape T, over the case when the rotation head 3 comes into contact with the tape T.

There has been known means for reducing such an impact error. For example, as shown in FIGS. 2A and 2B protrusions (namely, bulges) 4a and 4b are slightly protruded beyond a travel path of the tape T from upper portions of the fixed lower drum 1b of the rotation head device near tape inlet and tape outlet portions, respectively, The bulges 4a and 4b serve to inhibit an abrupt deformation of the tape T into a tent shape when the rotation head 3 comes into contact with the tape T and moves away from the tape T, The bulges 4a and 4b also inhibit a longitudinal vibration of the tape T and reduces an impact error generated from the tape T, At a position near the tape inlet portions of the fixed lower drum 1b and the rotating upper drum 1a, the tape T is wound around the upper drum 1a above the rotation head 3, as shown in FIG. 2A. Accordingly, the tape T is radially spaced from the peripheral surface of the upper drum 1a. However, the radial space of the tape T is smaller than the thickness of the bulge 4a. As a result, it is difficult to inhibit the lateral vibration of the tape T and thereby to effectively reduce the impact error. At a position near the outlet portions of the fixed lower drum 1b and the rotating upper drum 1a, the portion of the tape T disposed above the rotation head 3 is wound around the upper drum 1a, as shown in FIG. 2B. However, little air film is present between the tape portion and the upper drum 1a. As a result, the upper edge of the tape T vibrates severely in lateral direction. Due to such a vibration, it is difficult to effectively reduce the impact error.

SUMMARY OF THE INVENTION

Therefore, an object of the invention is to eliminate the above-mentioned disadvantages encountered in the prior art and to provide a variable bulge device for a rotation head drum, capable of effectively reducing an impact error.

Another object of the invention is to provide a variable bulge device for a rotation head drum, capable of adjusting protruded amount and position of the bulge in accordance with the kind of a tape used and a rotation speed of the rotating head drum.

In accordance with one aspect, the present invention provides a variable bulge device for a rotation head drum, comprising: an operating member partially protruded at one end thereof through a bulge hole formed at a lower drum of said rotation head drum, said operating member having a variable bulge provided by said protruded end; and drive means for driving the operating member and thereby adjusting the protruded amount and position of said variable bulge.

In accordance with another aspect, the present invention provides a variable bulge device for a rotation head drum, comprising: a hollow elastic rubber film partially protruded at an upper end thereof through a bulge hole formed at a lower drum of said rotation head drum, said elastic rubber film having a variable bulge provided by said protruded end; an operating fluid contained in the elastic rubber film; operating fluid expanding means adapted to expand said operating fluid in accordance with kind of a tape used and a rotation speed of the rotation head drum and thereby adjust the protruded amount of said variable bulge.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

Figure 1:
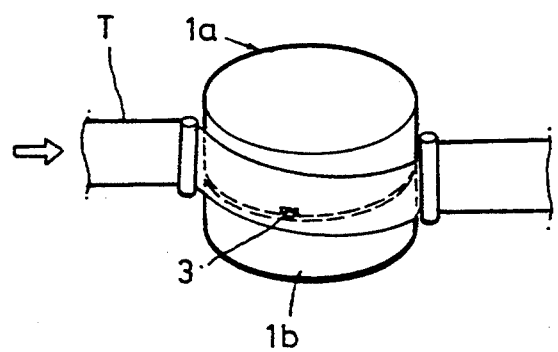
FIG. 1 is a perspective view of a conventional rotation head drum.
Figure 2A:
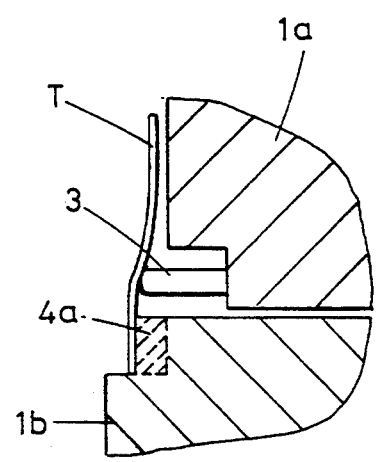
FIGS. 2A and 2B are sectional views respectively illustrating an essential part of the conventional rotation head drum shown in FIG. 1.
Figure 2B:
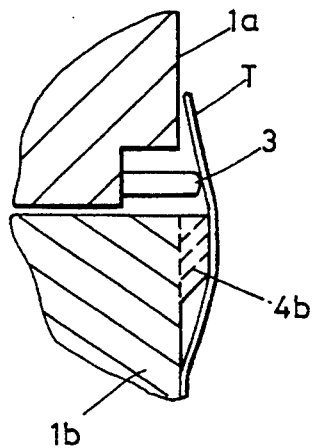
Figure 3A:
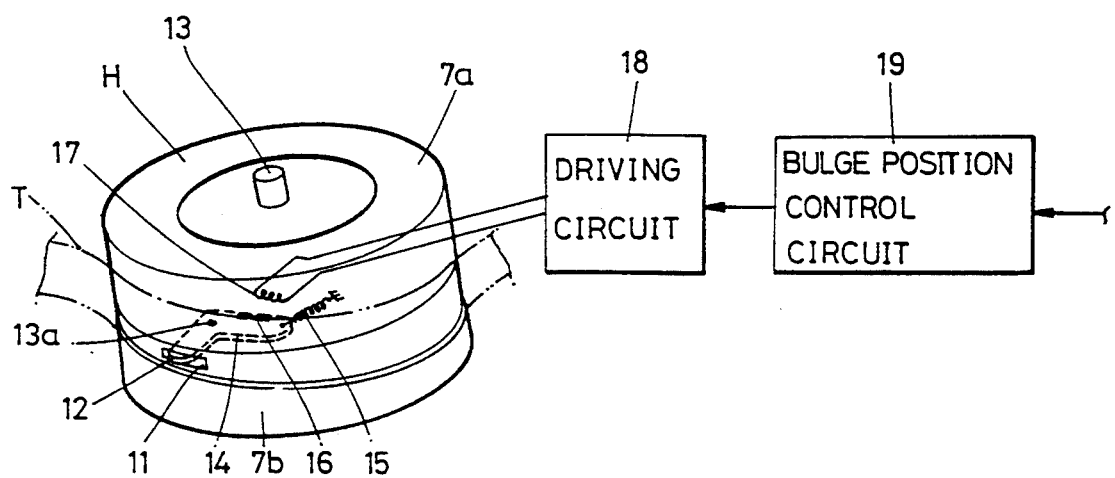
FIGS. 3A and 3B are a perspective view and a plan view respectively illustrating a variable bulge device in accordance with a first embodiment of the present invention.
Figure 3B:
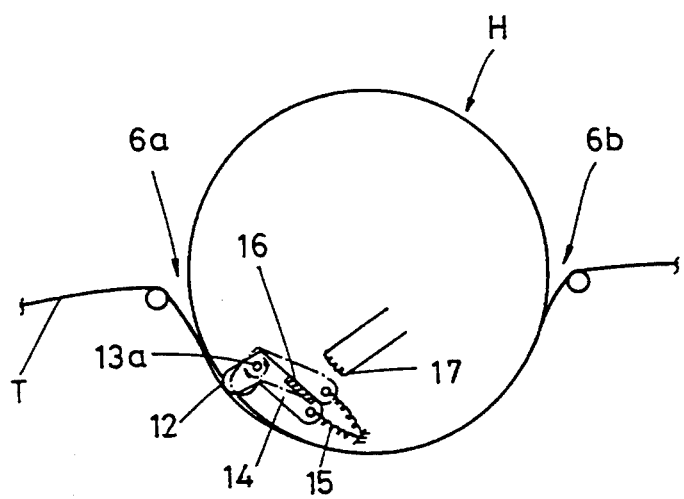

FIGS. 3A and 3B are a perspective view and a plan view respectively illustrating a variable bulge device in accordance with a first embodiment of the present invention.

In FIGS. 3A and 3B, a rotation head drum H is shown which includes an upper drum 7a rotatable about a rotation shaft 13, and a fixed lower drum 7b. The variable bulge device includes an operating member having a variable bulge 12 slightly protruded from a bulge hole 11 formed at each bulge position of the lower drum 7b, and a drive unit for driving the operating member so as to adjust the protruded amount and position of the variable bulge 12.

The operating member is a pivotal lever 14 pivotable about a pivot pin 13a mounted at a proper position of the upper portion of the lower drum 7b. The pivotal lever 14 has one portion protruded through the bulge hole 11 to constitute the variable bulge 12 and the other portion resiliently supported by a resilient; member 15 fixedly mounted to the upper portion of the lower drum 7a. On the other hand, the drive unit includes a magnet 16 fixedly mounted to one edge of the other portion of the pivotal lever 14, and a coil 17 supported in the interior of the upper portion of the lower drum 7b such that it is spaced a certain distance from the magnet 16.

In FIGS. 3A and 3B, the reference numeral 18 denotes a drive circuit electrically connected to the coil 17. The reference numeral 19 denotes a bulge position control circuit for applying a signal to the drive circuit 18.

Now, an operation of the variable bulge device having the above-mentioned construction will be described.

Figure 4A:
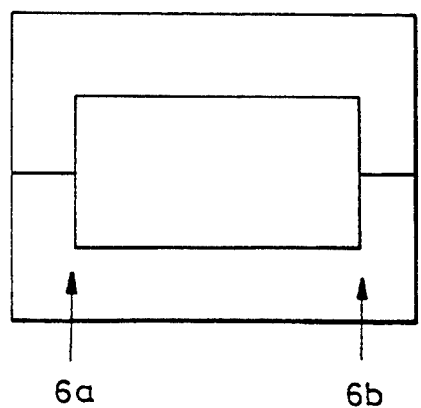
FIGS. 4A and 4B are graphs respectively illustrating RF waveforms generating from portions of a tape entering and leaving a rotation head drum.

As a tape T slantly wound around peripheral surfaces of the upper and lower drums 7a and 7b is travelled, the variable bulge 12 protruded through the bulge hole 11 comes into contact with the tape T. When the protruded amount and position of the variable bulge 12 becomes incorrect during the travel of the tape T being in contact with the variable bulge 12, that is, when a distortion of RF waveform occurs at the entering and leaving portions 6a and 6b of the tape T, a corresponding signal is transmitted to the drive circuit 18 via the bulge position control circuit 19 so as to supply a certain amount of current to the coil 17. As a result, the coil 17 is activated to electrically interact with the magnet 16. By this interaction, the pivotal lever 14 pivots in anti-clockwise about the pivot pin 13a against the resilience of the resilient member 14, thereby adjusting the protruded amount and position of the variable bulge 12. This operation is continued until the RF waveform shown in FIG. 4A is generated.

Figure 7:
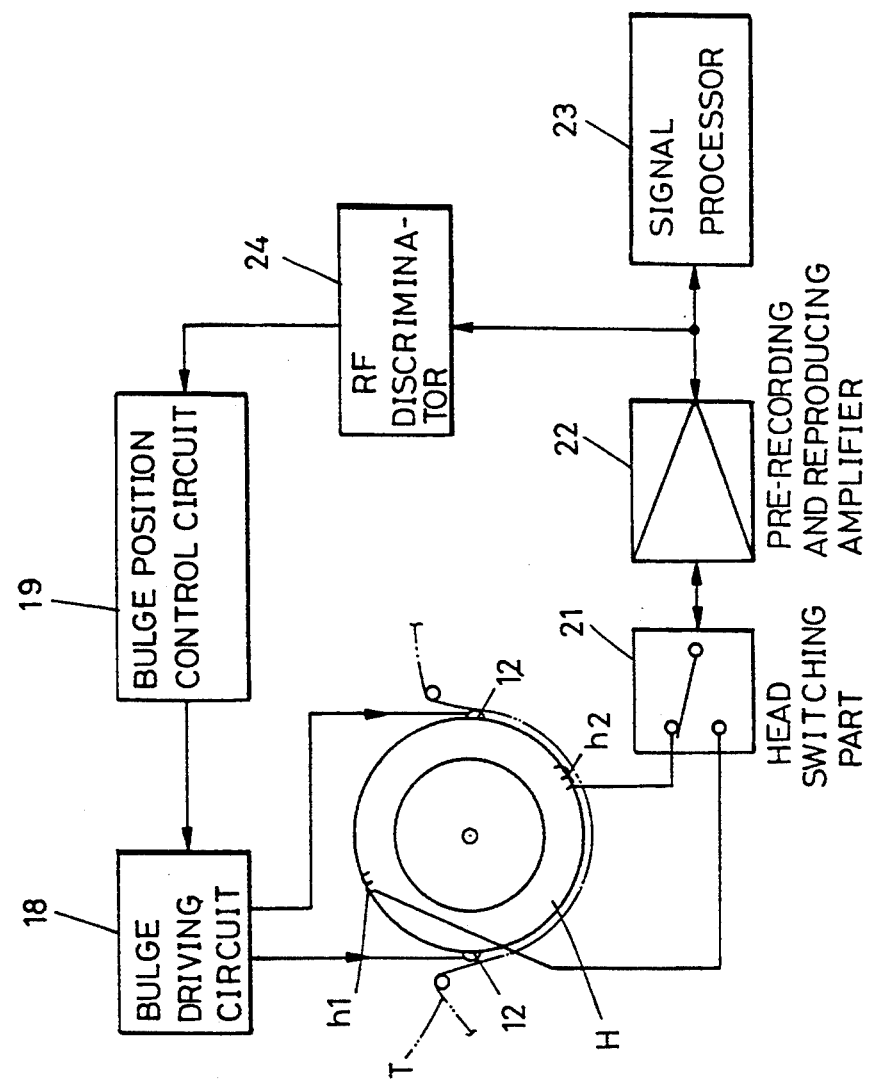
FIG. 7 is a block diagram of a drive system for the variable bulge device in accordance with the present invention.

This operation will be described in detail, in conjunction with FIG. 7.

Figure 4B:
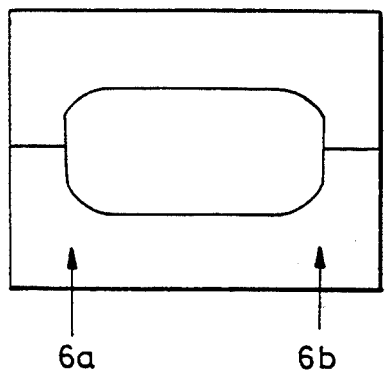

Signals from magnetic heads h1 and h2 of the rotating head drum H is sent to a front end recording/reproducing amplifier 22 via a head switching circuit 22, amplified in the amplifier 22 and then transmitted to a signal processing circuit 23. At this time, a RF discriminator 24 discriminates the RF waveform of each signal transmitted to the signal processing circuit 23. Where a signal having an abnormal waveform is detected by the RF discriminator 24, as shown in FIG. 4B, it is transmitted to the bulge drive circuit 18 via the bulge position control circuit 19. The bulge drive circuit 18 operates until a normal waveform is detected, as shown in FIG. 4A.

Figure 5A:
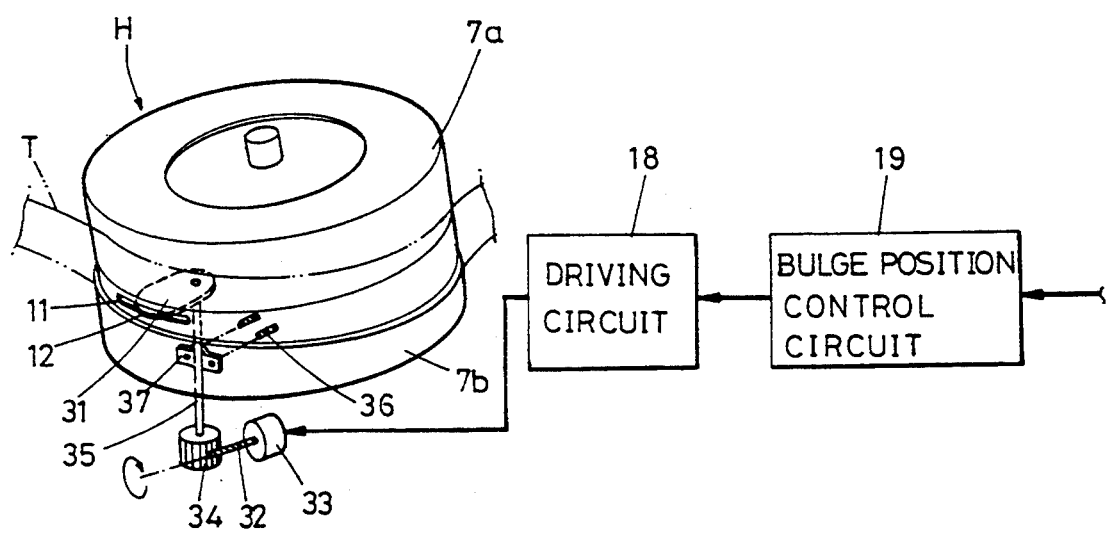
FIGS. 5A and 5B are a perspective view and a plan view respectively illustrating a variable bulge device in accordance with a second embodiment of the present invention.
Figure 5B:
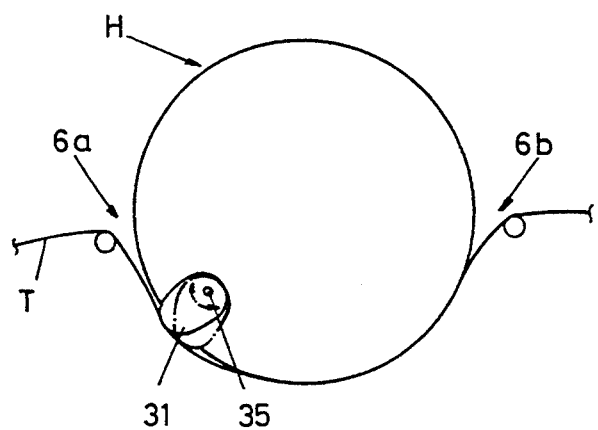

On the other hand, FIGS. 5A and 5B are a perspective view and a plan view respectively illustrating a variable bulge device in accordance with a second embodiment of the present invention.

In accordance with this embodiment, a cam 31 is disposed at a part of the upper portion of the lower drum 7b such that it can pivot about a rotation shaft 35. The cam 31 is partially protruded through the bulge hole 11. The protruded portion of the cam 31 is the variable bulge 12. The rotation shaft 35 is rotatable supported at its middle portion by a semicircular support member 37 fixedly mounted to the inner wall of the lower drum 7b by means of several set screws 36. A worm wheel 34 is fixedly mounted to the lower end of the rotation shaft 35. The worm wheel 34 is engaged with a worm 32 coupled to a shaft of a drive motor 33.

Now, an operation of the variable bulge device having the above-mentioned construction will be described.

When a distortion of RF waveform occurs at the entering and leaving portions 6a and 6b of the tape T, as shown in FIG. 4B, a corresponding signal is transmitted to the drive circuit 18 via the bulge position control circuit 19 so as to drive the drive motor 33. As the drive motor 33 drives, the worm 32 coupled to the shaft of the drive motor 33 rotates, thereby causing the worm wheel 34 to rotate. By the rotation of the worm wheel 34, the rotation shaft 35 rotates, thereby causing the cam 31 to pivot about the rotation shaft 35. As a result, the protruded amount and position of the variable bulge 12 can be adjusted.

Figure 6:
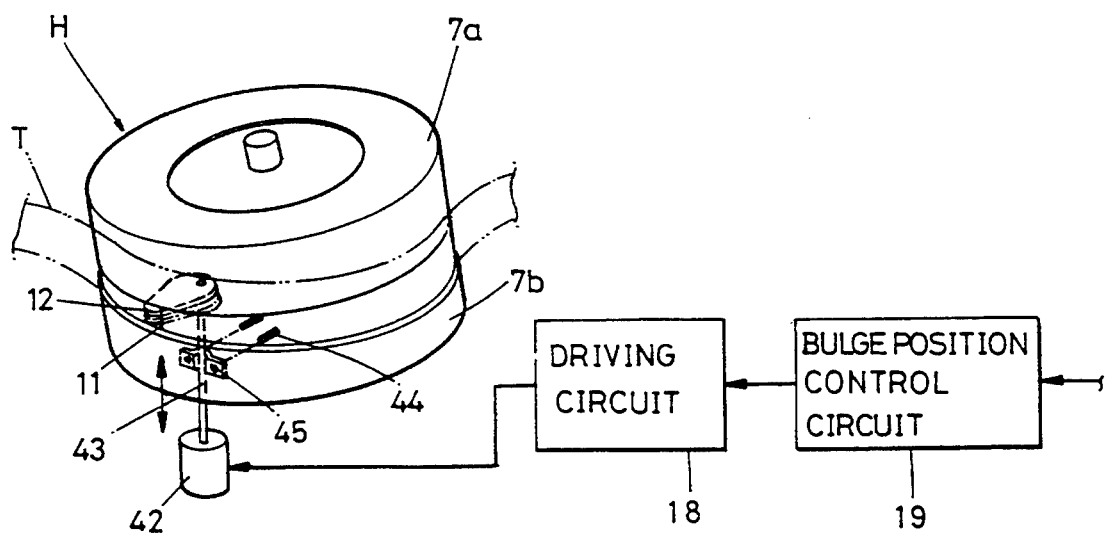
FIG. 6 is a perspective view of a variable bulge device in accordance with a third embodiment of the present invention.

Referring to FIG. 6, there is illustrated a variable bulge device in accordance with a third embodiment of the present invention.

In accordance with this embodiment, a lifter 41 is used in place of the cam 31 of the second embodiment, as shown in FIG. 6. A solenoid valve 42 is directly connected to the drive circuit 18. The solenoid valve 42 has an elongated plunger 43 connected at the upper end thereof with the lifter 41.

With this construction, the lifter 41 can move upwards and downwards when the plunger 43 moves in directions indicated by the arrow of FIG. 6. By this vertical movement of the lifter 41, the protruded portion of the lifter 41 through the bulge hole 11, namely, the variable bulge 12 can be vertically adjusted in position.

Similar to the rotation shaft 35 of the second embodiment, the plunger 43 is rotatable supported at its middle portion by a semicircular support member 45 fixedly mounted to the inner wall of the lower drum 7b by means of several set screws 44.

As apparent from the above description, the first to third embodiments use the variable bulge capable of reducing the impact error of the tape and varying the protruded amount and position thereof, depending on the rotation speed of the rotating head drum and the kind of the tape. As a result, it is possible to obtain an optimized output of the magnetic head.

Figure 8:
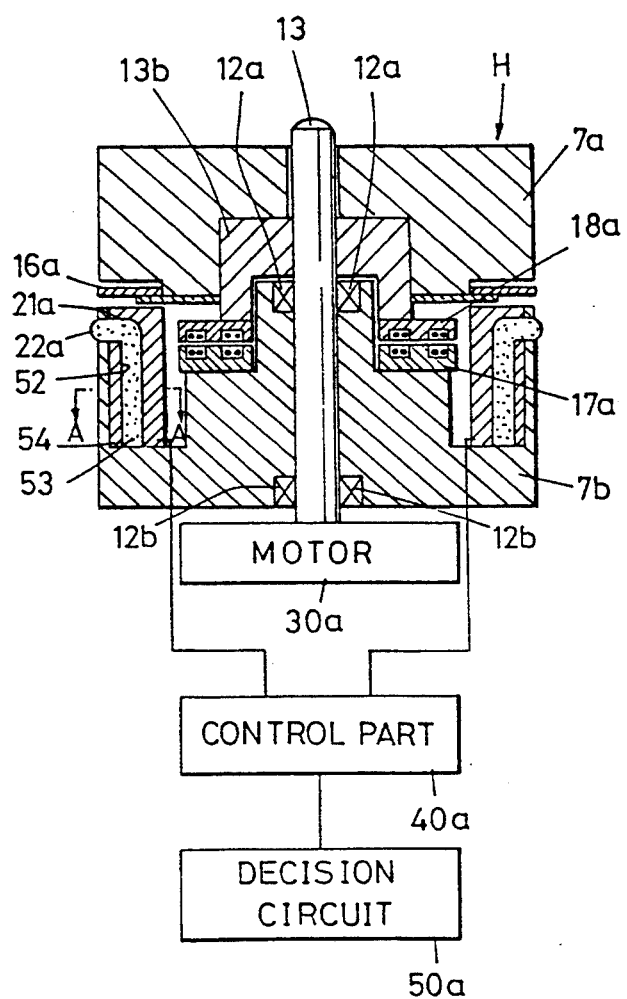
FIG. 8 is a sectional view of a variable bulge device in accordance with a fourth embodiment of the present invention.

Referring to FIG. 8, there is illustrated a variable bulge device in accordance with a fourth embodiment of the present invention.

As shown in FIG. 8, the variable bulge device is provided at a rotation head drum H having a typical construction. The rotation head drum H includes a lower drum fixedly mounted on a drum base (not shown), a rotation shaft 13 extending through a central throughout hole of the lower drum 7b and rotatable supported by upper and lower bearings 12a and 12b disposed at proper portions of the lower drum 7b, a flange 13b forcedly fitted around the upper portion of the rotation shaft 13, an upper drum 7a fixedly mounted on the flange 13b, a magnetic head 16a fixedly mounted on the lower surface of the upper drum 7a, a plurality of stators 17a fixedly mounted on the upper surface of the lower drum 7b, a plurality of rotors 18a fixedly mounted on the lower surface of the flange 13b and spaced a predetermined distance from the stators 17a, and a motor 30a disposed beneath the lower drum 7b and connected with the rotation shaft 13.

In accordance with the fourth embodiment of the present invention, the variable bulge device provided at the rotation head drum H having the above-mentioned construction includes a pair of hollow elastic rubber films 52 disposed in the lower drum 7b. The elastic rubber films 52 have the same construction and, thus, the following description will be made in conjunction with only one of the elastic rubber films 52, for the simplicity of the description. The elastic rubber film 52 is provided with an upper end 22a outwardly protruded through a bulge hole 21a formed at the peripheral wall of the lower drum 7b. The outwardly protruded upper end 22a of the elastic rubber film 52 serves as a variable bulge. In the elastic rubber film 52, an operating fluid 53 such as air or liquid is contained. The variable bulge device further includes a unit for expanding the operating fluid 53 and thereby adjusting the protruded amount of the variable bulge 22a, depending on the kind of the tape used and the rotation speed of the rotating head drum H.

The elastic rubber film 52 is comprised of a thin film such as a rubber balloon. As the operating fluid 53 contained in the elastic rubber film 52 expands, the protruded amount of the variable bulge 22a through the bulge hole 21a of the lower drum 7b is increased.

On the other hand, the operating fluid expanding unit comprises a heating member 54 surrounding the elastic rubber film 52. The heating member 54 is fixedly disposed in the lower drum 7b. The heating member 54 may be comprised of a nichrome wire, a filament or a ceramic. Of course, other materials may be used for the heating member 54.

In FIG. 8, the reference numeral 40a denotes a control circuit electrically connected to the heating member 54. The reference numeral 50a denotes a circuit for determining the kind of the tape and the rotation speed of the rotating head drum H.

Now, an operation of the variable bulge device having the above-mentioned construction will be described.

Figure 14A:
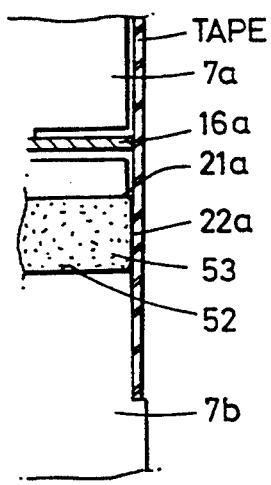
FIGS. 14A and 14B are sectional views respectively illustrating different states of the variable bulge device of the present invention.
Figure 14B:
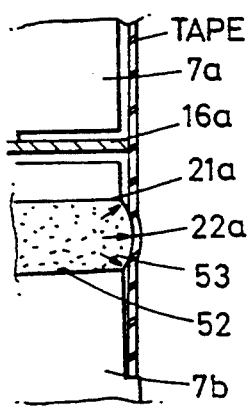

When the heating member 54 receives a signal generated by the determination circuit 50a and the control circuit 40a in accordance with the kind of the tape and the rotation speed of the rotating head drum H, it is heated to a level corresponding to the received signal indicative of the kind of the tape and the rotation speed of the rotating head drum H. As the heated level of the heating member 54 is adjusted by the received signal, the operating fluid 53 contained in the elastic rubber film 52 is expanded or shrunk. As a result, the protruded amount of the variable bulge 22a can be optionally adjusted, as shown in FIGS. 14A and 14B. FIG. 14A shows the shrunk state of the operating fluid 53 whereas FIG. 14B shows the expanded state of the operating fluid 53 wherein the variable bulge 22a is in its protruded state.

Figure 9:
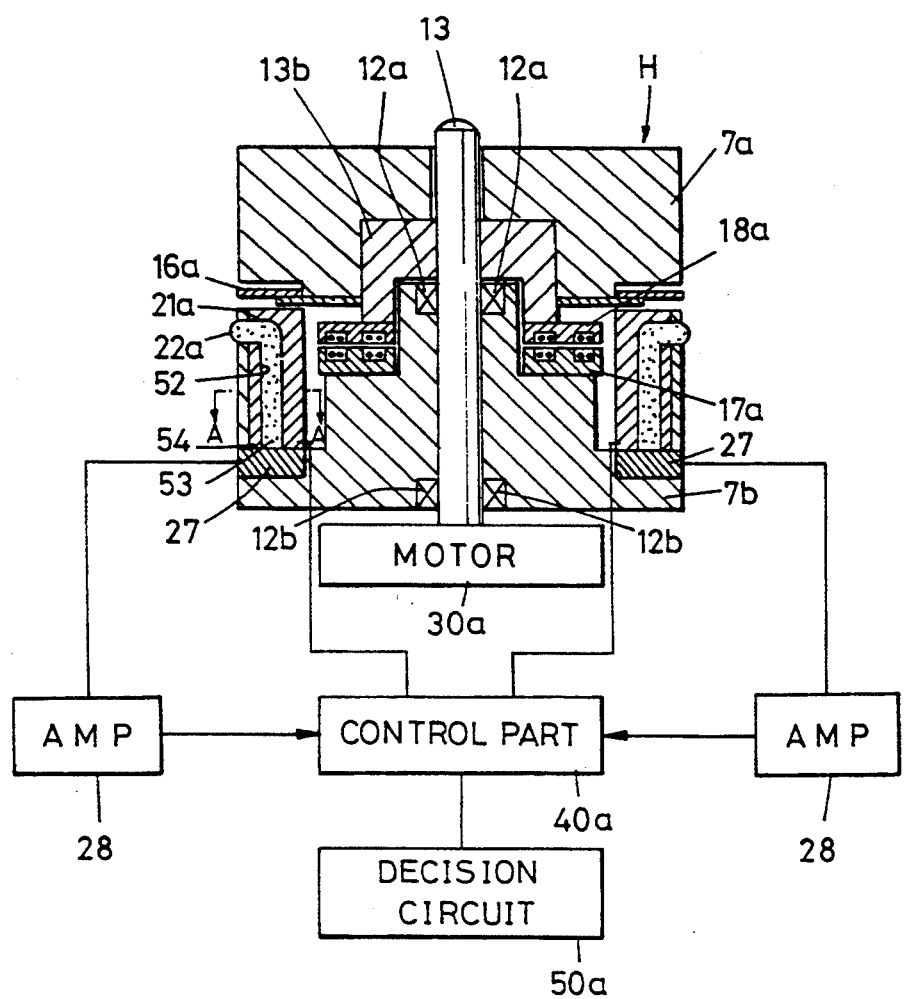
FIG. 9 is a sectional view of a variable bulge device in accordance with a fifth embodiment of the present invention.

FIG. 9 is a schematic sectional view of a variable bulge device in accordance with a fifth embodiment of the present invention.

This embodiment is similar to the fourth embodiment shown in FIG. 8, except for a pressure sensor 27 disposed at the lower end of the elastic rubber film 52 and adapted to sense the pressure of the operating fluid 53. The pressure sensor 27 is electrically connected to an amplifier 28 which is, in turn, electrically connected to the control circuit 40a. By the provision of the pressure sensor 27 for sensing the pressure of the operating fluid 53, the control circuit 40a can control the heating member 54 more accurately.

Figure 10A:
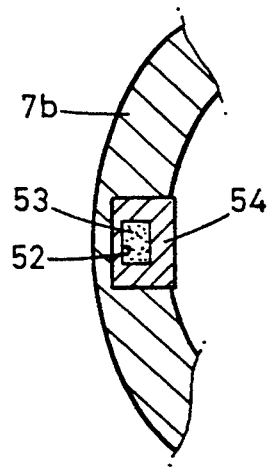
FIGS. 10A to 10C are cross-sectional views respectively taken along the line A—A of FIG. 8 and illustrating various mounting constructions for an elastic rubber film used in the cases of FIGS. 8 and 9.
Figure 10B:
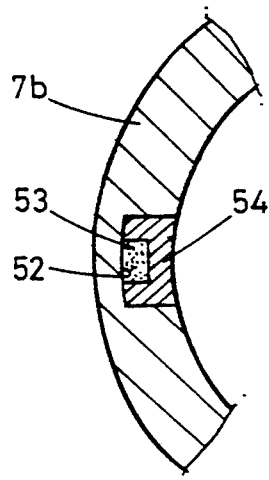
Figure 10C:
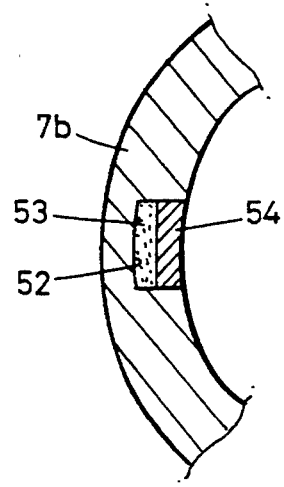

The constructions of the fourth and fifth embodiments associated with the heating member 54 may be variously modified as shown in FIGS. 10A to 10C.

FIG. 10A shows a case wherein the elastic rubber film 52 is disposed in the central portion of the heating member 54. FIG. 10B shows a case wherein the elastic rubber film 52 is disposed in the left portion of the heating member 54. On the other hand, FIG. 10C shows a case wherein the elastic rubber film 52 is disposed on the left side surface of the heating member 54. In each case, the operating fluid 53 is contained in the elastic rubber film 52.

Also, the operating fluid expanding unit may be variously modified, as shown in FIGS. 11A to 13.

Figure 11A:
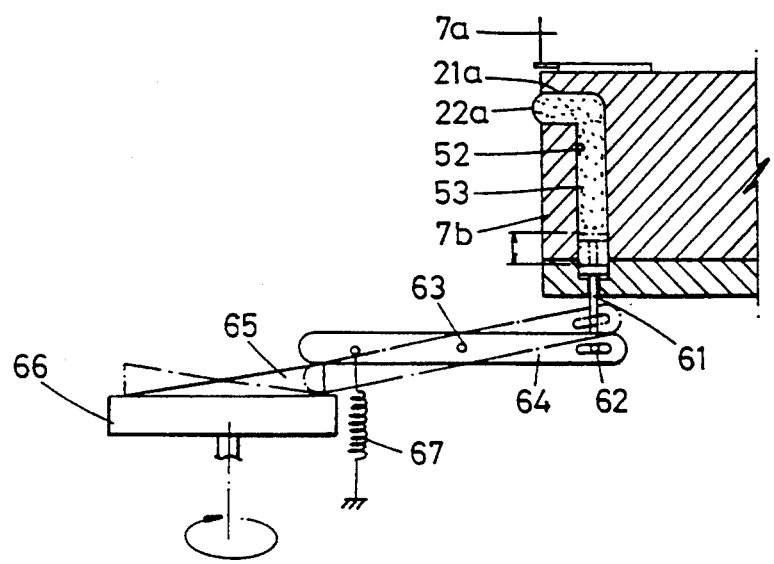
FIG. 11A is a partially-sectioned front view of a variable bulge device in accordance with a sixth embodiment of the present invention.
Figure 11B:
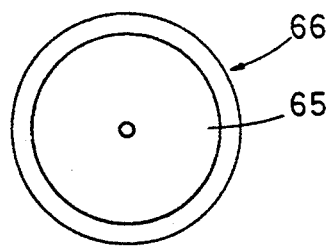
FIG. 11B is a plan view illustrating a cam used in the case of FIG. 11A.

In a case illustrated in FIGS. 11A and 11B, the operating fluid expanding unit comprises a piston 61 disposed near the lower end of the elastic rubber film 52 and adapted to compress or release the operating fluid 53 contained in the elastic rubber film 52, a seesaw lever 64 connected at one end thereof to the lower end of the piston 61 by means of a connecting pin 62 and pivotally supported to a pivot pin 63, a cam gear 66 provided with a cam 65 being in contact with the other end of the seesaw lever 64 to pivot the seesaw lever 64 and, thereby, slide the piston 61, and a resilient member 67 adapted to resiliently urge the seesaw lever 64 such that the other end of the seesaw lever 64 is always in contact with the cam 65.

It is preferred that the resilient member 67 is a tension coil spring or a torsion spring always urging the seesaw lever 64 in a direction that the seesaw lever 64 pivots in clockwise about the pivot pin 63.

Where the seesaw lever 64 connected to the cam 65 is used in place of the pressure sensor 27 of the fifth embodiment, the control circuit 40a (FIGS. 8 and 9) applies a control signal to the cam 65. As the cam 65 rotates by the control signal from the control circuit 40a, the seesaw lever 64 in contact with the cam 65 by the resilience of the resilient member 67 pivots about the pivot pin 63 against the resilience of the resilient member 67 in accordance with a variation in height of the cam 65. By the pivotal movement of the seesaw lever 64, the piston 61 slides vertically. The vertical linear movement of the piston 61 results in a compression or release of the operating fluid 53 and, thus, an expansion or shrinkage of the elastic rubber film 52.

Figure 12:
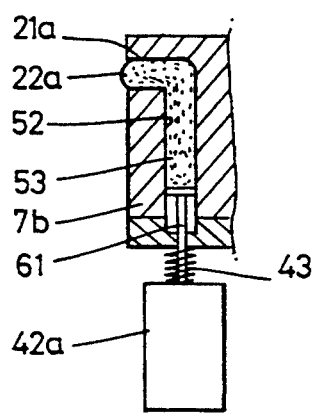
FIG. 12 is a sectional view illustrating a modified construction of an operating fluid expanding unit in accordance with the present invention.

In a case illustrated in FIG. 12, a spring 43 and a solenoid valve 42a are used in place of the seesaw lever 64 connected to the piston 61, so as to vertically slide the piston 61. The spring 43 is disposed between the piston 61 and the solenoid valve 42a and adapted to limit the downward movement of the piston 61.

Where the piston 61 is used, as in the cases shown in FIGS. 11A to 12, it is preferred that the elastic rubber film 52 is disposed beyond the stroke range of the piston 61 so as to prevent it from being damaged by the sliding piston 61.

Figure 13:
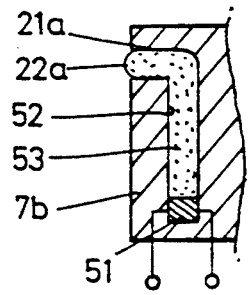
FIG. 13 is a sectional view illustrating another modified construction of the operating fluid expanding unit in accordance with the present invention.

In a case illustrated in FIG. 13, a piezo actuator 51 is disposed at the lower end of the elastic rubber film 52. As a controlled voltage is applied to the piezo actuator 51, the operating fluid 53 contained in the elastic rubber film 52 is expanded or shrunk.

As apparent from the above description, the present invention provides a variable bulge device for a rotation head drum, capable of adjusting a protruded amount of a bulge used, depending on a rotation speed of the rotating head drum and the kind of a tape used. As a result, the travel stability of the tape can be improved.

Although the preferred embodiments of the invention have been disclosed for illustrative purposes, those skilled in the art, will appreciate that various modifications, additions and substitutions are possible, without departing from the scope and spirit, of the invention as disclosed in the accompanying claims.

What is claimed is:

1. A variable bulge device for a rotation head drum, comprising:

an operating member in a lower drum of said rotation head drum, said operating member having a cam mounted on a rotation shaft where said cam partially protrudes through a bulge hole by a protruded amount in the lower drum;

driving means for driving the operating member and thereby adjusting the protruded amount for said variable bulge, said driving means including a driving motor having a worm gear and including a worm wheel engaged to be driven by the worm gear, said worm wheel connected to the rotation shaft to cause the protruded amount for the variable bulge to be controlled by operation of the driving motor; and supporting means for movably attaching the rotation shaft to an inner wall of the lower drum.

2. A variable bulge device for a rotation head drum, comprising:

an operating member partially protruded through a bulge hole formed at a lower drum of said rotation head drum to form a variable bulge wherein said operating member comprises a pivoting lever pivotally supported by a pivot pin fixedly mounted on a predetermined portion of said lower drum, said pivoting lever having one end connected to resilient means and another end protruding through said bulge hole to form the variable bulge; and driving means for driving thee operating member said driving means including a magnet fixedly mounted to the pivoting lever and including a coil fixedly supported by the lower drum and spaced a distance from the magnet to magnetically drive the magnet and the pivoting lever to thereby adjust the protruded amount of the variable bulge.

3. The variable bulge device in accordance with claim 2, wherein said resilient means comprises a tension coil spring.

4. A variable bulge device for a rotation head drum comprising:

an operating member partially protruded through a bulge hole formed at a lower drum of said rotation head drum, said operating member including a vertically movable lifter protruding through said bulge hole and movable in up and down directions to control movements of a variable bulge in up and down directions, and driving means including a plunger connected at one end to said lifter and connected at another end to a solenoid valve, said solenoid valve adapted to move the plunger up and down whereby the variable bulge is moved in the up down directions.

5. The variable bulge device in accordance with claim 4 wherein said plunger is supported by a support member fixedly mounted on an inner wall of said lower drum such that the plunger is vertically slidable in the up and down directions.

6. A variable bulge device for displacing bulges of a rotation head drum for rotating a tape at a rotation speed, comprising:

a hollow elastic rubber film partially protruded through a bulge hole formed at a lower drum of said rotation head drum, said elastic rubber film having a variable bulge provided on said protruded end;

an operating fluid contained in said hollow elastic rubber film;

operating fluid expanding means adapted to control the expansion of said operating fluid in accordance with parameters of said tape and said rotation speed to force said elastic rubber film through the bulge hole and thereby adjust the protruded amount of said variable bulge.

7. The variable bulge device in accordance with claim 6, wherein said operating fluid expanding means comprises a heating means surrounding said elastic rubber film.

8. The variable bulge device in accordance with claim 7, wherein said heating means is comprised of one selected from among a nichrome wire, a filament, and a ceramic.

9. The variable bulge device in accordance with claim 6, further comprising:

a pressure sensor disposed at a lower end of said elastic rubber film and adapted to sense a pressure of said operating fluid;

an amplifier connected to said pressure sensor and adapted to receive a pressure signal from the pressure sensor and amplify said received pressure signal; and a control circuit connected to said amplifier and adapted to generate a control signal based on said pressure signal and send said control signal to said operating fluid expanding means.

10. The variable bulge device in accordance with claim 6, wherein said operating fluid expanding means comprises:

a piston disposed at one side of a lower end of said elastic rubber film, said piston being adapted to compress or release said operating fluid;

a seesaw lever connected at one end thereof to a lower end of the piston and pivotally supported at a middle portion thereof to a pivot pin;

a cam in contact with the other end of the seesaw lever to pivot the seesaw lever, thereby vertically sliding the piston according to movements of the cam; and resilient means adapted to resiliently urge the other end of the seesaw lever in contact with said cam.

11. The variable bulge device in accordance with claim 10, wherein said resilient means comprises a tension coil spring or a torsion spring.

12. The variable bulge device in accordance with claim 6, wherein said operating fluid expanding means comprises:

a piston disposed at one side of a lower end of said elastic rubber film and reciprocally moveable in substantially a compressed direction or a released direction;

a solenoid valve operatively connected to a lower end of the piston and adapted to vertically slide the piston; and resilient means disposed between the piston and the solenoid valve and adapted to limit the downward movement of the piston to a predetermined distance.

13. The variable bulge device in accordance with claim 6, wherein said operating fluid expanding means comprises a piezo actuator disposed at a lower end of said elastic rubber film.

* * * * *